United States Patent [19]
Cartwright et al.

[11] Patent Number: 5,695,202
[45] Date of Patent: Dec. 9, 1997

[54] FLEXIBLE BOOT FOR ENCLOSING A UNIVERSAL JOINT

[75] Inventors: Mark A. Cartwright; Robert Geyer; Gerald K. Oxley, all of Lafayette, Ind.

[73] Assignee: TRW Inc., Lyndhurst, Ohio

[21] Appl. No.: 721,727

[22] Filed: Sep. 27, 1996

[51] Int. Cl.$^6$ ............................................. F16J 15/32
[52] U.S. Cl. ............................................. 277/212 FB
[58] Field of Search ................. 277/212 R, 212 FB; 464/173, 175; 403/50, 51; 74/18

[56] References Cited

U.S. PATENT DOCUMENTS

| Re. 33,701 | 9/1991 | Triquet | 277/212 FB |
|---|---|---|---|
| 2,702,996 | 3/1955 | Davis | 74/18.1 |
| 2,761,295 | 9/1956 | Davis | 464/175 |
| 4,003,667 | 1/1977 | Gaines et al. | 277/212 FB |
| 4,282,722 | 8/1981 | Orain | 277/212 FB |
| 4,360,209 | 11/1982 | Ukai et al. | 464/175 |
| 4,456,269 | 6/1984 | Krude et al. | 277/212 FB |
| 4,673,188 | 6/1987 | Matsuno et al. | 277/212 FB |
| 4,957,469 | 9/1990 | Zollinger | 464/175 |
| 5,230,660 | 7/1993 | Warnke | 464/146 |
| 5,251,916 | 10/1993 | Martin et al. | 277/212 FB |
| 5,366,316 | 11/1994 | Cymbal | 403/378 |
| 5,509,324 | 4/1996 | Cymbal | 74/492 |
| 5,568,930 | 10/1996 | Urbach | 277/212 FB |

FOREIGN PATENT DOCUMENTS 2591301   6/1987   France ............................. 464/175

Primary Examiner—William A. Cuchlinski, Jr.
Assistant Examiner—John L. Beres
Attorney, Agent, or Firm—Tarolli, Sundheim, Covell, Tummino & Szabo

[57] ABSTRACT

A flexible boot (10) comprises a body (80) which defines a cavity (82) for receiving a universal joint (50). A first end portion (100) of the body (80) encircles an intermediate steering shaft (30). The first end portion (108) includes a pair of annular ribs (110 and 112) and a first annular lip (102) which extends radially inward to provide a seal between the first end portion (100) of the body (80) and the intermediate steering shaft (30). The pair of annular ribs (100 and 112) are located adjacent the first annular lip (102) and extend radially inward. The pair of ribs (110 and 112) define a recess (118) therebetween. The flexible boot (10) further comprises a bearing (90) in the recess (118) for supporting rotation of the intermediate steering shaft (30) relative to the flexible boot (10), and a second end portion (120) of the body (80) which includes a second annular lip (122) for receipt in a groove (62) on a steering gear housing (60) to secure the body (80) to the steering gear housing (60). A center portion (140) of the body (80) interconnects the first end portion (100) with the second end portion (120). The center portion (140) is axially expandable.

6 Claims, 3 Drawing Sheets

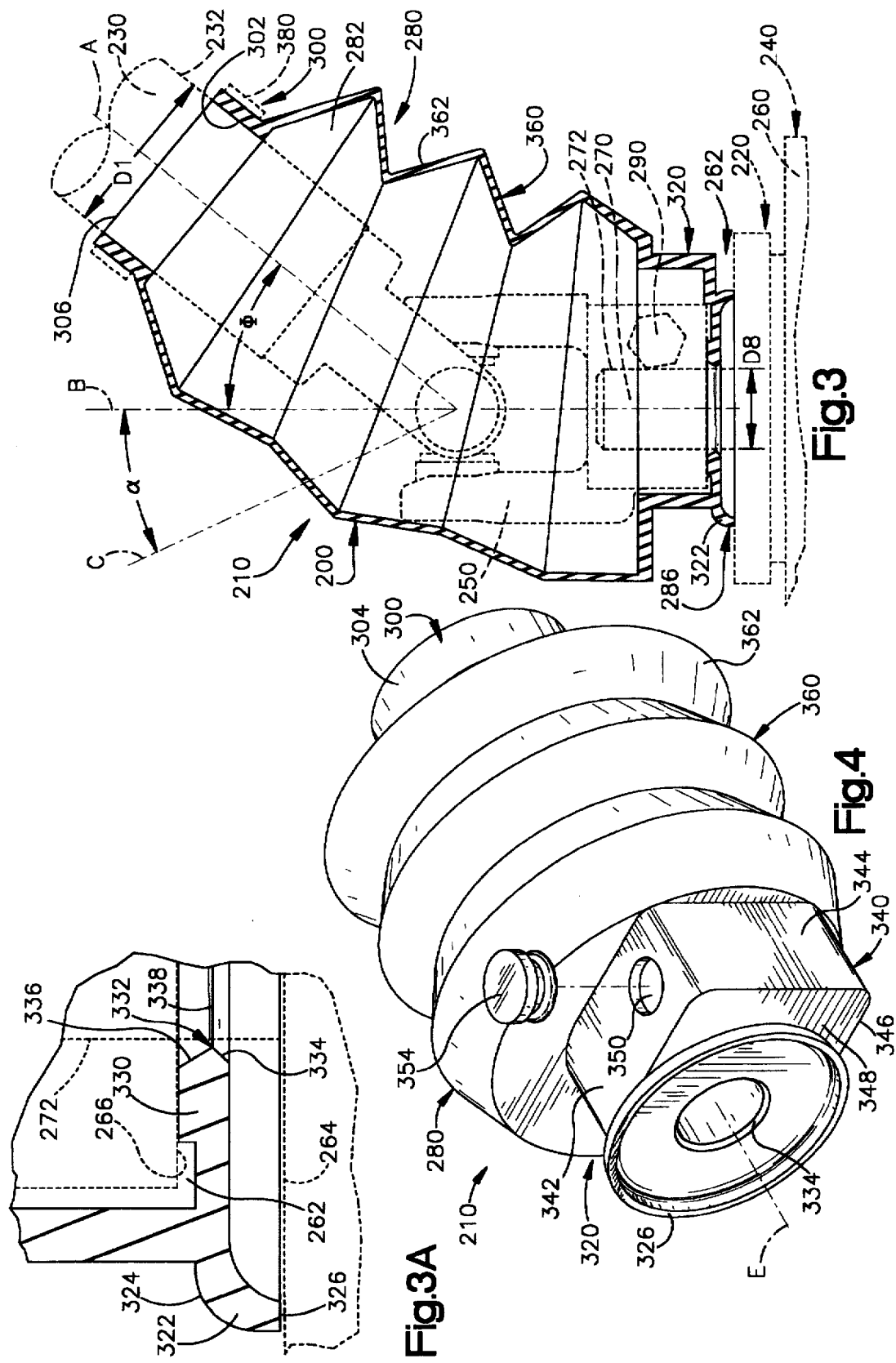

FLEXIBLE BOOT FOR ENCLOSING A UNIVERSAL JOINT

FIELD OF THE INVENTION

The present invention relates to a flexible boot for enclosing a universal joint, and, in particular, to a flexible boot for enclosing a universal joint which connects an intermediate steering shaft to a steering gear input shaft.

BACKGROUND OF THE INVENTION

One typical vehicle steering system utilizes a universal joint, commonly referred to as a "U-joint", to connect an intermediate steering shaft to a steering gear input shaft. The intermediate steering shaft is fixed for rotation with the vehicle steering wheel along a first axis, while the steering gear input shaft is supported for rotation about a second axis which is offset from the first axis. The universal joint permits rotation of the intermediate steering shaft to be transferred into rotation of the steering gear input shaft, which then causes the wheels of the vehicle to be turned.

In order to preserve the life and proper function of the universal joint, the universal joint is usually enclosed in a protective, flexible boot. The flexible boot is intended to prevent dirt, water, or other contaminants from getting into the universal joint and leading to diminished performance or premature failure of the universal joint.

SUMMARY OF THE INVENTION

In accordance with one embodiment of the present invention, a flexible boot for enclosing a universal joint connecting an intermediate steering shaft to a steering gear input shaft, which extends from a steering gear housing, comprises a body which defines a cavity for receiving the universal joint. The body has a first end portion for encircling the intermediate steering shaft. The first end portion includes a pair of annular ribs and a first annular lip which extends radially inward to provide a seal between the first end portion of the body and the intermediate steering shaft. The pair of annular ribs are located adjacent the first annular lip and extend radially inward. The pair of ribs define a recess therebetween.

The flexible boot further comprises a bearing in the recess for supporting rotation of the intermediate steering shaft relative to the flexible boot. A second end portion of the body includes a second annular lip for receipt in a groove on the steering gear housing to secure the body to the steering gear housing. A center portion of the body interconnects the first end portion with the second end portion. The center portion is axially expandable.

In accordance with a second embodiment of the present invention, a flexible boot is provided for enclosing a universal joint which connects an intermediate steering shaft to a steering gear input shaft. The flexible boot comprises a body which defines a cavity for receiving the universal joint. The body has a first end portion for encircling the intermediate steering shaft. The first end portion is fixed to the intermediate steering shaft and the body rotates with the intermediate steering shaft.

The body further comprises a second end portion including an annular lip and an access opening. The annular lip is located at a distal end of the body and provides a seal between the second end portion and the steering gear housing. The access opening provides access to the universal joint. Means are provided for removably sealing the access opening. A center portion of the body interconnects the first end portion with the second end portion. The center portion is axially expandable.

BRIEF DESCRIPTION OF THE DRAWINGS

Further features of the present invention will become apparent to those skilled in the art to which the present invention relates from reading the following specification with reference to the accompanying drawings, in which:

FIG. 3 is a schematic illustration of a portion of a vehicle steering system including a flexible boot in accordance with a second embodiment of the invention;

FIG. 3A is an enlarged view of a portion of FIG. 3; and

FIG. 4 is a perspective view of the flexible boot of FIG. 3.

DESCRIPTION OF PREFERRED EMBODIMENTS OF THE INVENTION

Figure 1:
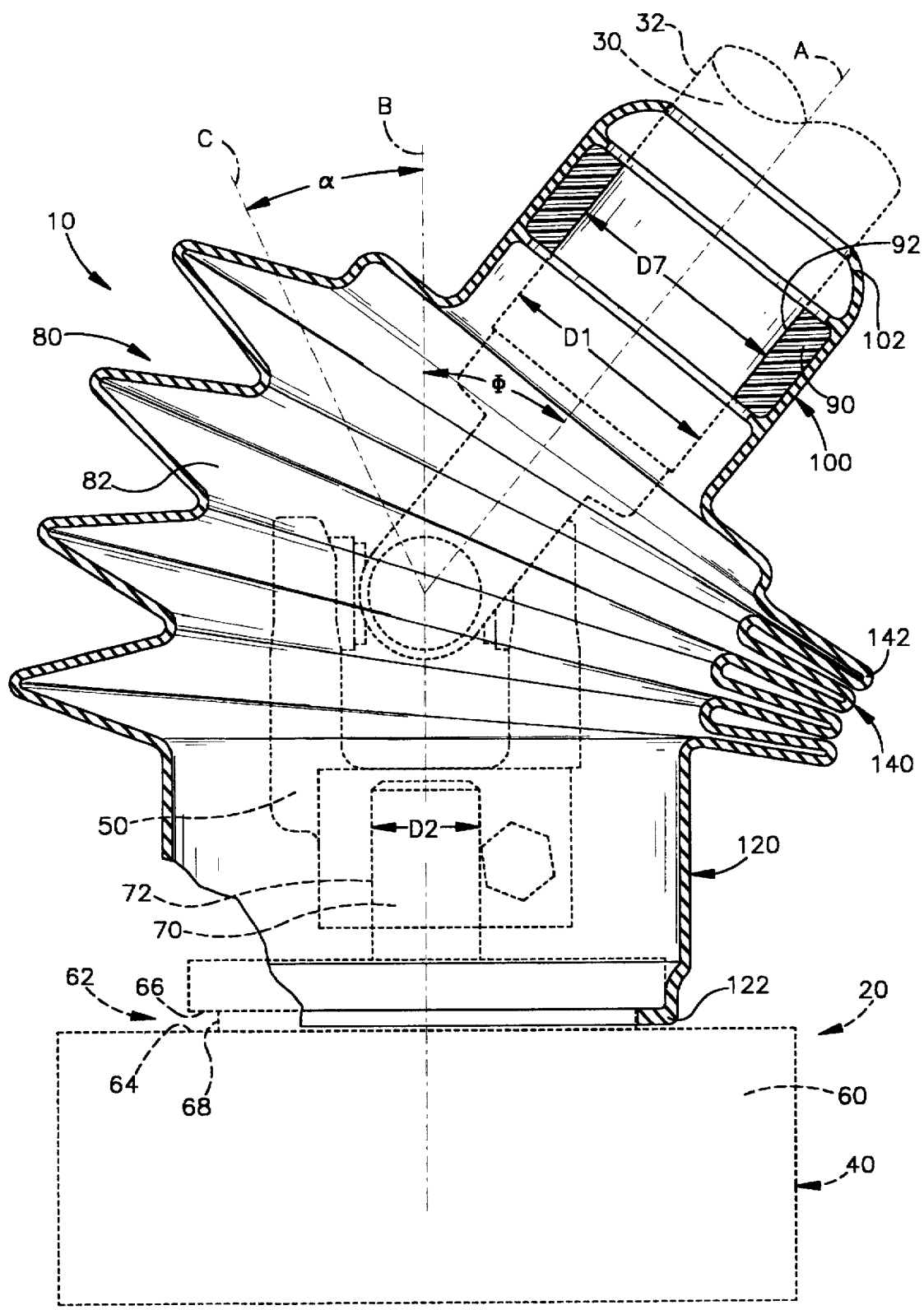
FIG. 1 is a schematic illustration of a portion of a vehicle steering system including a flexible boot in accordance with a first embodiment of the invention.

The present invention relates to a flexible boot for enclosing a universal joint, and, in particular, to a flexible boot for enclosing a universal joint which connects an intermediate steering shaft to a steering gear input shaft. As representative of the present invention, FIG. 1 illustrates a flexible boot 10. The flexible boot 10 is incorporated into a vehicle steering system 20.

The steering system 20 includes an intermediate steering shaft 30, a steering gear assembly 40, and a universal joint 50. The intermediate steering shaft 30 is fixed for rotation with the vehicle steering wheel (not shown). The intermediate steering shaft 30 is generally cylindrical in shape and is centered on an axis A. An outer surface 32 of the intermediate steering shaft 30 has a diameter D1.

The steering gear assembly 40 includes a steering gear housing 60 and a steering gear input shaft 70. The steering gear assembly 40 is centered on a vertical axis B which is offset by an angle α from a vertical centerline C for the vehicle. The axis B is offset from the axis A of the intermediate steering shaft 30 by an angle Φ. The steering gear housing 60 is fixed to the vehicle chassis (not shown). The steering gear housing 60 has an annular groove 62 which extends radially inward toward the axis B. The groove 62 is defined by a first radially extending surface 64, a second radially extending surface 66, and an axially extending surface 68 which interconnects the first and second radially extending surfaces 64 and 66.

The steering gear input shaft 70 projects outward from the steering gear housing 60 as shown in FIG. 1. The steering gear input shaft 70 is generally cylindrical in shape and has an outer surface 72 with a diameter D2. The steering gear input shaft 70 is supported for rotation relative to the steering gear housing 60 about the axis B.

The universal joint 50 connects the intermediate steering shaft 30 to the steering gear input shaft 70. The universal joint 50 is constructed according to a known configuration which accomplishes a universal-type connection. The universal joint 50 permits rotation of the intermediate steering shaft 30 about the axis A to be transferred into rotation of the steering gear input shaft 70 about the axis B.

The flexible boot 10 encloses the universal joint 50 as shown in FIG. 1. The flexible boot 10 comprises a body 80 defining a cavity 82 and an internal bearing 90. The body 80 of the boot 10 may be made of neoprene or another similarly suited material. As may been in FIGS. 1 and 2, the body 80 includes a first end portion 100, a second end portion 120, and a center portion 140.

Figure 2:
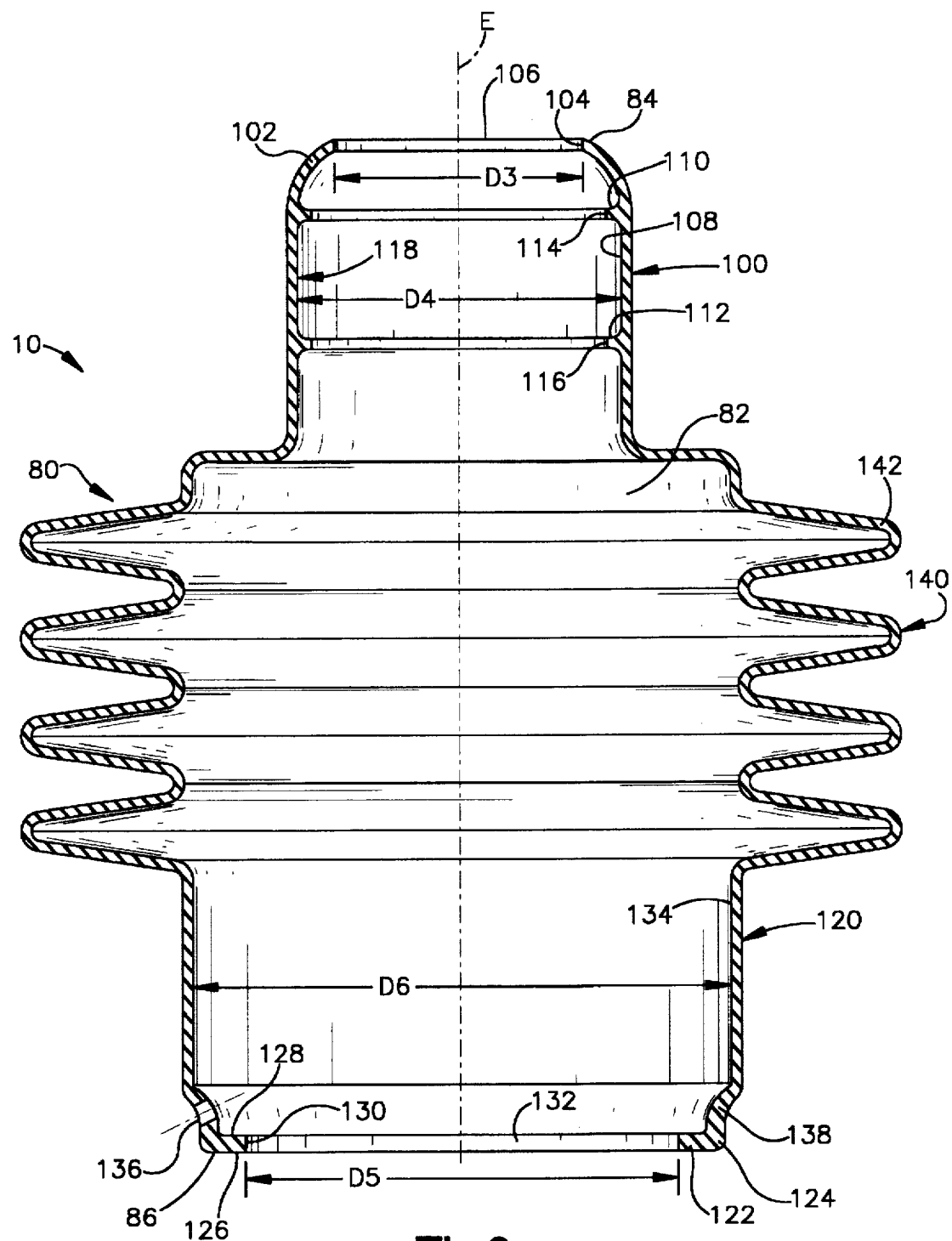
FIG. 2 is a sectional view of the flexible boot of FIG. 1 with parts removed and in a free condition.

Referring now to FIG. 2, the body 80 of the flexible boot 10 is shown in a free disassembled condition. The body 80 is annular and is symmetrical about an axis E. The first end portion 100 of the body 80 of the boot 10 includes a first annular lip 102 and a pair of annular ribs 110 and 112. The first annular lip 102 is located at a distal end 84 of the body 80 of the boot 10 and is curved radially inward toward the axis E. The first annular lip 102 includes a first surface 104 which defines a first opening 106 into the cavity 82. The first opening 106 has a diameter D3 which substantially similar to the diameter D1 of the intermediate steering shaft 30. The first end portion 100 further includes a second surface 108 which extends axially along the inside of the first end portion 100 and which defines a diameter D4 for the first end portion 100.

The pair of annular ribs 110 and 112 are located adjacent the first annular lip 102 in the first end portion 100 of the body 80. The pair of ribs 110 and 112 extend radially inward from the second surface 108 of the first end portion 100 to a terminal inner edge 114 and 116 for the ribs 110 and 112, respectively. The ribs 110 and 112 are spaced apart along the axis E as shown in FIG. 2. An annular recess 118 is defined between the pair of ribs 110 and 112.

The second end portion 120 of the body 80 of the flexible boot 10 includes a second annular lip 122. The second annular lip 122 is located at another distal end 86 of the body 80 of the boot 50 and includes a portion 124 which curves sharply radially inward toward the axis E, as shown in FIG. 2. The second annular lip 122 further includes a first radially extending surface 126, a second radially extending surface 128, and an axially extending surface 130 which interconnects the first and second radially extending surfaces 126 and 128. The axially extending surface 130 defines a second opening 132 into the cavity 82 in the body 80 of the boot 10. The second opening 132 has a diameter D5 which is substantially larger than the diameter D2 of the steering gear input shaft 70, but which is substantially equal to the diameter of the axially extending surface 68 of the steering gear housing 60.

The second end portion 120 of the body 80 of the flexible boot 10 further includes an inner surface 134 and an optional drain opening 136. The inner surface 134 defines a inside diameter D6 for the second end portion 120. The inside diameter D6 in the second end portion 120 of the body 80 of the boot 10 is larger than the inside diameter D4 in the first end portion 100 of the body 80. The optional drain opening 136 in the second end portion 120 is located in a wall portion 138 adjacent the second annular lip 122 as shown in FIG. 2.

The center portion 140 of the body 80 of the flexible boot 10 interconnects the first end portion 100 with the second end portion 120. The center portion 140 comprises radially extending corrugations 142 which are known in the art.

As is apparent from FIG. 2, the first end portion 100, the second end portion 120, and the center portion 140 of the body 80 are integral with one another and comprise a single, one-piece member.

Referring again to FIG. 1, the annular bearing 90 is configured to be press-fit into the recess 118 between the pair of ribs 110 and 112 in the first end portion 100 of the body 80 of the flexible boot 10. The bearing 90 may be made from polyethylene or another suitable material. The bearing 90 includes an axially and circumferentially extending inner surface 92 having a diameter D7 which is substantially equal to the outer diameter D1 of the intermediate steering shaft 30.

When the flexible boot 10 is installed in the steering system 20, the steering gear input shaft 70 is received in the second opening 132 into the cavity 82 in the body 80 of the boot 10. The second end portion 120 of the body 80 of the boot 10 encircles the steering gear input shaft 70 and part of the universal joint 50 as may be seen in FIG. 1. The second annular lip 122 is received in the annular groove 62 on the steering gear housing 60. The first radially extending surface 126 of the lip 122 engages the first radially extending surface 64 of the groove 62. Similarly, the second radially extending surface 128 of the lip 122 engages the second radially extending surface 66 of the groove 62. The axially extending surface 130 of the lip 122 and the axially extending surface 68 of the groove 62 also engage one another.

When the second annular lip 122 is received in the groove 62, the second annular lip 122 snaps into the groove 62 to secure the body 80 of the flexible boot 10 to the steering gear housing 60. The snap-fit of the second annular lip 122 into the groove 62 provides a seal between the second end portion 120 of the body 80 of the boot 10 and the steering gear housing 60. The optional drain opening 136, which is located adjacent the second annular lip 122, permits any water which becomes trapped inside the cavity 82 of the body 80 of the boot 10 to drain out of the cavity 82.

At the other end of the flexible boot 10, the intermediate steering shaft 30 is received in the first opening 106 into the cavity 82 in the body 80 of the boot 10. The first end portion 100 of the body 80 encircles the intermediate steering shaft 30. The first annular lip 102 engages the outer surface 32 of the intermediate steering shaft 30 with an interference fit which provides a seal between the first end portion 100 of the body 80 of the boot 10 and the intermediate steering shaft 30. This interference fit provides a preload which is sufficient to form the aforementioned seal.

Inside the first end portion 100 of the body 80 of the flexible boot 10, the intermediate steering shaft 30 is supported for rotation relative to the body 80 of the boot 10 by the annular bearing 90. The surface 92 of the bearing 90, which is disposed farther into the cavity 82 than the terminal edges 114 and 116 of the ribs 110 and 112, respectively, engages the outer surface 32 of the intermediate steering shaft 30 to support the rotation of the shaft 30.

In the center portion 140 of the body 80 of the flexible boot 10, the radially extending corrugations 142 permit the body 80 of the boot 10 to be axially expanded as well as radially deflected. As may be seen in FIG. 1, radial deflection of the body 80 of the boot 10 is necessary in order for the body 80 of the boot 10 to provide the seal against the intermediate steering shaft 30, which is centered on the axis A, and the seal against the steering gear housing 60, which is centered on the axis B.

The seal which is provided between the body 80 of the flexible boot 10 and the intermediate steering shaft 30, as well as the seal which is provided between the body 80 of the boot 10 and the steering gear housing 60, protect the universal joint 50 from dirt, water, or other contaminants which can damage the universal joint 50.

A second embodiment of the present invention is illustrated in FIGS. 3, 3A and 4. In the second embodiment, a flexible boot 210 is incorporated into a vehicle steering system 220.

The steering system 220 is identical to the steering system 20 described above with regard to the first embodiment of the present invention. The steering system 220 includes an intermediate steering shaft 230, a steering gear assembly 240, and a universal joint 250. The intermediate steering shaft 230 is fixed for rotation with the vehicle steering wheel (not shown). The intermediate steering shaft 230 is generally cylindrical in shape and is centered on an axis A. An outer surface 232 of the intermediate steering shaft 230 has a diameter D1.

The steering gear assembly 240 includes a steering gear housing 260 and a steering gear input shaft 270. The steering gear assembly 240 has a vertical axis B which is offset at an angle α from a vertical centerline C for the vehicle. The axis B is offset from the axis A of the intermediate steering shaft 230 by an angle Φ. The steering gear housing 260 is fixed to the vehicle chassis (not shown). The steering gear input shaft 270 projects outward from the steering gear housing 260 as shown in FIG. 3. The steering gear input shaft 270 is generally cylindrical in shape and has an outer surface 272 with a diameter D2. The steering gear input shaft 270 is supported for rotation relative to the steering gear housing 260 about the axis B.

The universal joint 250 connects the intermediate steering shaft 230 to the steering gear input shaft 270. The universal joint 250 is constructed according to a known configuration which accomplishes a universal-type connection. The universal joint 250 permits rotation of the intermediate steering shaft 230 about the axis A to be transferred into rotation of the steering gear input shaft 270 about the axis B.

An annular groove 262 in the steering gear 220 is defined between an upper radially extending surface 264 of the steering gear housing 260, a lower radially extending surface 266 of the universal joint 250, and the outer surface 272 of the steering gear input shaft 270, as illustrated in FIG. 3A.

The flexible boot 210 encloses the universal joint 250 as shown in FIG. 3. The flexible boot 210 comprises a body 280 defining a cavity 282. The body 280 of the boot 210 may be made of neoprene or another similarly suited material. The body 280 is annular and is symmetrical about an axis E (FIG. 4) prior to being installed in the steering system 220.

The body 280 includes a first end portion 300, a second end portion 320, and a center portion 360. The first end portion 300 has a diameter which substantially similar to the diameter D1 of the intermediate steering shaft 230. The first end portion 300 of the body 280 is annular in shape and includes a inner surface 302 and an outer surface 304 (FIG. 4). The inner surface 302 defines a first opening 306 into the cavity 282 in the body 280 of the boot 210.

Referring now to FIGS. 3, 3A, and 4, the second end portion 320 of the body 280 of the flexible boot 210 includes an annular lip 322, an annular rib 330, a radial pocket 340, an access opening 350, and a resilient plug 354. The annular lip 322 is located at a distal end 286 of the body 280 and includes a curved portion 324 and a radially extending surface 326.

The annular rib 330 is located adjacent the annular lip 322. The annular rib 330 extends in a radially inward direction and terminates in an annular knife edge 332 which is defined by the intersection of first and second tapering surfaces 334 and 336, respectively. The knife edge 332 of the rib 330 defines a second opening 338 into the cavity 282 in the body 280 of the flexible boot 210. The second opening 338 has a diameter D8 (FIG. 3) which is slightly larger than the diameter D2 of the steering gear input shaft 270.

Referring now to FIG. 4 only, the radial pocket 340 in the second end portion 320 is located adjacent the annular rib 330. The radial pocket 340 has a substantially square-shaped cross-section which extends radially outward from the axis E. The radial pocket 340 is defined by a first planar surface 342, a second planar surface 344, a third planar surface 346, and a fourth planar surface 348. The radial pocket 340 is sized to be large enough to enclose a part of the universal joint 250.

The access opening 350 is located in the first planar surface 342 of the radial pocket 340 in the second end portion 320. The access opening 350 is normally sealed by the resilient plug 354. The resilient plug 354 is configured to fit tightly when pressed into the access opening 350 but be removable if desired.

As illustrated in FIGS. 3 and 4, the center portion 360 of the body 280 of the flexible boot 210 interconnects the first end portion 300 with the second end portion 320. The center portion 360 comprises radially extending corrugations 362 which are known in the art.

As is apparent from FIGS. 3 and 4, the first end portion 300, the second end portion 320, and the center portion 360 of the body 280 are integral with one another and comprise a single, one-piece member.

When the flexible boot 210 is installed in the steering system 220, the steering gear input shaft 270 is received in the second opening 338 into the cavity 282 in the body 280 of the boot 210. The second end portion 320 of the body 280 encircles the steering gear input shaft 270 and part of the universal joint 250 as may be seen in FIG. 3. The annular lip 322 contacts the radially extending surface 264 of the steering gear housing 260 to provide a seal between the second end portion 320 of the body 280 and the steering gear housing 260. While the lip 322 is in contact with the surface 264 of the steering gear housing 260, the lip 322 (and the entire body 280) remains free to rotate relative to the housing 260.

The annular rib 330 in the second end portion 320 is loosely received in the annular groove 262 defined between the radially extending surface 264 on the steering gear housing 260 and the radially extending surface 266 on the universal joint 250 as shown in FIG. 3A. The terminal edge 332 of the annular rib 330 closely encircles the outer surface 272 of the steering gear input shaft 270.

The radial pocket 340 in the second end portion 320 of the body 280 of the boot 210 encircles a part of the universal joint 250 as shown in FIG. 3. With the boot 210 installed in the steering system 220, the access opening 350 in the surface 342 of the radial pocket 340 provides access to components of the universal joint 250 such as the nut 290 shown in FIG. 3, without having to remove the boot 210. It should be apparent that an additional access opening and associated resilient plug could be located in the surface 346 of the radial pocket 340. The additional access opening would provide access to the head of a bolt which is associated with the nut 290.

At the other end of the boot 210, the intermediate steering shaft 230 is received in the first opening 306 into the cavity 282 in the body 280 of the boot 210. The first end portion 300 encircles the intermediate steering shaft 230 and is fixed to the shaft 230 with a ring-shaped clamp 380 (FIG. 3). By fixing the first end portion 300 of the body 280 to the shaft 230, the body 280 of the flexible boot 210 is thereby fixed for rotation with the intermediate steering shaft 230, and a seal is provided between the first end portion 300 of the body 280 and the shaft 230.

In the center portion 360 of the body 280 of the flexible boot 210, the radially extending corrugations 362 permit the body 280 of the boot 210 to be axially expanded as well as radially deflected. As may be seen in FIG. 3, radial deflection of the body 280 of the boot 210 is necessary in order for the body 280 of the boot 210 to provide the seal against the intermediate steering shaft 230, which is centered on the axis A, and the seal against the steering gear housing 260, which is centered on the axis B.

The seal which is provided between the body 280 of the flexible boot 210 and the intermediate steering shaft 230, as well as the seal which is provided between the body 280 of the boot 210 and the steering gear housing 260, protect the universal joint 250 from dirt, water, or other contaminants which can damage the universal joint 250.

From the above description of the invention, those skilled in the art will perceive improvements, changes and modifications to the invention. For example, the flexible boot could be modified to use axially extending corrugations instead of radially extending corrugations. Further, the flexible boots described herein could be adapted for enclosing a constant-velocity joint (or "CV joint") associated with a drive shaft in a front-wheel drive vehicle. Such improvements, changes and modifications are intended to be covered by the appended claims.

Having described the invention, the following is claimed:

1. A flexible boot for use in a vehicle steering shaft assembly, said flexible boot for enclosing a universal joint connecting an intermediate steering shaft to a steering gear input shaft which extends from a steering gear housing, said flexible boot comprising:

a body defining a cavity for receiving the universal joint;

a first end portion of said body for encircling the intermediate steering shaft, said first end portion having a first cylindrical side wall and including a pair of annular ribs which extend radially inward from said first cylindrical side wall and which define a recess therebetween, said first end portion further including a single first annular lip which curves radially inward from one of said pair of annular ribs and provides a seal between said first end portion of said body and the intermediate steering shaft;

a bearing in said recess for supporting rotation of the intermediate steering shaft relative to said flexible boot;

a second end portion of said body having a second cylindrical side wall and a single second annular lip, said single annular lip being for receipt in a groove on the steering gear housing, said single second annular lip extending radially inward from one end of said second cylindrical side wall with sufficient preload to secure said body to the steering gear housing and to provide a seal between said second end portion of said body and the steering gear housing; and a flexible center portion of said body interconnecting said first and second cylindrical side walls, said flexible center portion consisting essentially of a plurality of radially extending corrugations, said flexible center portion being expandable and contractible in both radial and axial directions to permit radial deflection of said first end portion of said body relative to said second end portion of said body upon installation of said flexible boot in the vehicle steering shaft assembly.

2. The flexible boot as set forth in claim 1 wherein said second end portion further includes a drain opening located adjacent said second annular lip.

3. The flexible boot as set forth in claim 1 wherein said bearing is press fit into said recess defined by said pair of annular ribs, said bearing including an axially and circumferentially extending surface for engaging an outer surface of the intermediate steering shaft, said surface of said bearing being disposed farther radially inward than a terminal inner edge of each of said pair of annular ribs.

4. The flexible boot as set forth in claim 1 wherein said first end portion, said second end portion, and said center portion of said body are integral with one another and comprise a single, one-piece member.

5. An apparatus comprising:
an intermediate steering shaft;
a steering gear input shaft extending from a steering gear housing;
a universal joint connecting said intermediate shaft to said steering gear input shaft; and
a flexible boot for enclosing said universal joint, said flexible boot comprising:
a body defining a cavity for receiving said universal joint;
a first end portion of said body for encircling said intermediate steering shaft, said first end portion having a first cylindrical side wall and including a pair of annular ribs which extend radially inward from said first cylindrical side wall and which define a recess therebetween, said first end portion further including a single first annular lip which curves radially inward from one of said pair of annular ribs and provides a seal between said first end portion of said body and said intermediate steering shaft;
a bearing in said recess for supporting rotation of said intermediate steering shaft relative to said flexible boot;
a second end portion of said body having a second cylindrical side wall and a single second annular lip, said single annular lip being for receipt in a groove on said steering gear housing, said single second annular lip extending radially inward from one end of said second cylindrical side wall with sufficient preload to secure said body to said steering gear housing and to provide a seal between said second end portion of said body and said steering gear housing; and
a flexible center portion of said body interconnecting said first and second cylindrical side walls, said flexible center portion consisting essentially of a plurality of radially extending corrugations, said flexible center portion being expandable and contractible in both radial and axial directions to permit radial deflection of said first end portion of said body relative to said second end portion of said body upon installation of said flexible boot.

6. The apparatus as set forth in claim 5 wherein said bearing is press fit into said recess defined by said pair of annular ribs, said bearing including an axially and circumferentially extending surface for engaging an outer surface of said intermediate steering shaft, said surface of said bearing being disposed farther radially inward than a terminal inner edge of each of said pair of annular ribs.

* * * * *